(12) United States Patent
Salowey et al.

(10) Patent No.: US 8,407,464 B2
(45) Date of Patent: Mar. 26, 2013

(54) TECHNIQUES FOR USING AAA SERVICES FOR CERTIFICATE VALIDATION AND AUTHORIZATION

(75) Inventors: Joseph Salowey, Seattle, WA (US); Glen Zorn, Seattle, WA (US); Max Pritikin, Madison, WI (US)

(73) Assignee: Cisco Technology, Inc., San Jose, CA (US)

( * ) Notice: Subject to any disclaimer, the term of this patent is extended or adjusted under 35 U.S.C. 154(b) by 862 days.

(21) Appl. No.: 11/545,661

(22) Filed: Oct. 10, 2006

(65) Prior Publication Data

US 2008/0086634 A1    Apr. 10, 2008

(51) Int. Cl.
*H04L 29/06* (2006.01)
(52) U.S. Cl. .......................... 713/156; 726/3
(58) Field of Classification Search .............. 713/173, 713/156
See application file for complete search history.

(56) References Cited

U.S. PATENT DOCUMENTS

| | | | | |
|---|---|---|---|---|
| 6,301,618 B1 * | 10/2001 | Sitaraman et al. | ............ | 709/227 |
| 6,427,170 B1 * | 7/2002 | Sitaraman et al. | ............ | 709/226 |
| 6,466,977 B1 * | 10/2002 | Sitaraman et al. | ............ | 709/225 |
| 6,856,800 B1 * | 2/2005 | Henry et al. | ................ | 455/411 |
| 2001/0042202 A1 * | 11/2001 | Horvath et al. | ............... | 713/154 |
| 2002/0059228 A1 * | 5/2002 | McCall et al. | .................... | 707/6 |
| 2002/0184182 A1 * | 12/2002 | Kwan | ................................. | 707/1 |
| 2003/0014629 A1 * | 1/2003 | Zuccherato | ................... | 713/156 |
| 2004/0105431 A1 * | 6/2004 | Monjas-Llorente et al. | . . | 370/352 |
| 2005/0021969 A1 * | 1/2005 | Williams et al. | .............. | 713/176 |
| 2005/0021975 A1 * | 1/2005 | Liu | ............................... | 713/182 |
| 2006/0015724 A1 * | 1/2006 | Naftali et al. | ................. | 713/168 |

OTHER PUBLICATIONS

U.S. Appl. No. 11/378,577, filed Mar. 17, 2006, Joseph Salowey, et al.
Aboba, B., et al. "PPP EAP TLS Authentication Protocol" Oct. 1999; http://www.ietf.org/rfc/rfc2716.txt.

* cited by examiner

*Primary Examiner* — Edan Orgad
*Assistant Examiner* — Brian Olion
(74) *Attorney, Agent, or Firm* — Fish & Richardson P.C.

(57) ABSTRACT

In one embodiment, techniques to validate certificates using authentication, authorization, and accounting (AAA) services are provided. A service receives a request from a requester for validation of a certificate. The request may include the certificate associated with the requester. The servicer creates a AAA request that includes the certificate. The AAA request is then sent to the AAA server. A response is then received from the AAA server that includes a result of the certificate validation and also AAA attributes associated with any AAA services performed. The servicer may then validate the proof of possession of the private key or perform other type of authentication calculations after receiving the response from the AAA server if the response indicates the certificate was validated. The servicer can then perform an action based on the certificate validation and AAA attributes.

28 Claims, 5 Drawing Sheets

TECHNIQUES FOR USING AAA SERVICES FOR CERTIFICATE VALIDATION AND AUTHORIZATION

BACKGROUND

Embodiments of the present invention generally relate to digital security and more specifically to certificate validation using AAA services.

Certificate validation may be a complex process that is used to validate a requester, which may be requesting access to a service. The certificate validation may include validating chains, verifying extensions, extracting names and checking revocation status. The service may send the certificate to a certificate validation authority for the validation. If the certificate is validated by the certificate validation authority, other validations are often required. For example, authorizations for the requester often need to be determined based on attributes from the certificate. Further, an authentication may need to be performed, such as validation of proof of possession of a private key or some type of authentication may need to occur. This may involve sending additional requests for these validations. Accordingly, a service may send multiple requests to different parties to validate a requester. This requires many round trips in that requests and responses are received from different parties. This may be complicated and does not provide an integrated validation of a requester.

DESCRIPTION OF EXAMPLE EMBODIMENTS

Embodiments of the present invention validate certificates using authentication, authorization, and accounting (AAA) services. In one embodiment, a service receives a request from a requester for validation of a certificate or certificate chain. The request may include the certificate associated with the requester. The servicer creates a AAA request that includes the certificates. The AAA request is then sent to the AAA server. A response is received from the AAA server that includes a result of the certificate validation and also AAA attributes associated with any AAA services performed.

The servicer may then validate the proof of possession of the private key after receiving the response from the AAA server if the response indicates the certificate was validated. It should be noted that the servicer may also validate proof of possession before creating the AAA request. In this case, if the proof of possession is not valid, then the AAA request is not sent. The servicer can then perform an action based on the certificate validation and AAA attributes. For example, the servicer may allow access to a service based on the AAA attributes. In one example, the access provided is determined based on authorizations provided in the AAA attributes. Further, accounting services may be set up based on accounting information in the AAA attributes.

Figure 1:
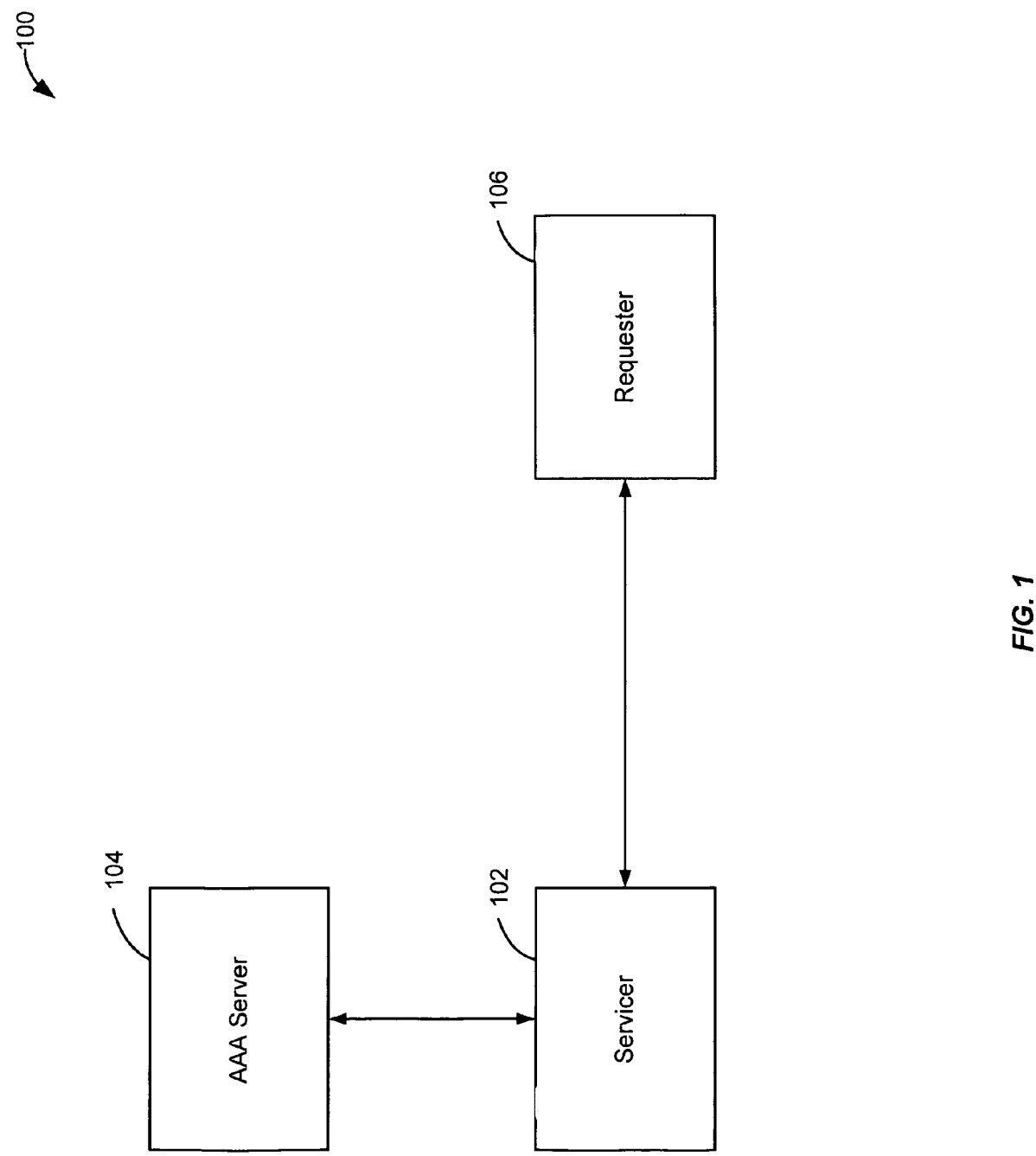
FIG. 1 depicts a simplified system for certificate validation using AAA services according to one embodiment of the present invention.

FIG. 1 depicts a simplified system 100 for certificate validation using AAA services according to one embodiment of the present invention. As shown, a servicer 102, AAA server 104, and a requester 106 are provided.

Requester 106 may be any computing device requesting services from servicer 102. Requester 106 may be requesting access to servicer 102. Requester 106 may provide one or more certificates associated with the request for services. The certificate may be a public key certificate that uses a digital signature to bind together a public key with an identity—information such as the name of a person or an organization, their address, etc. The certificate can be used to verify that a public key belongs to requester 106 (or an individual associated with requester 106). A certificate may also be an attribute certificate that binds attributes with an identity—information such as group membership, role affiliation and authorizations. The certificate can be used to verify that the attributes in the certificate that belong to a named identity known as a subject. One or both types of certificates may be available in the request. Digital certificates are known in the art and need not be described in further detail.

Requester 106 may also be associated with a private key. The public key and the private key are related. Requester 106 provides private key ownership information for a validation of the proof of possession of the private key. The private key ownership information may be any information that shows that requester 106 is in possession of the private key that is associated with the public key of the certificate. Requestor 106 may also have alternate authentication credentials, such as a password, shared secret or Kerberos ticket used to prove its identity.

Servicer 102 may be a server or any other computing device that provides a service. Servicer 102 may include a web server, router, host, computer, etc. For example, servicer 102 may provide access to resources that may be used by requester 106. The resources may be files, or any other information. Other services may also be provided by servicer 102.

AAA server 104 provides AAA services. In one embodiment, AAA services include validation. The validation, as used, may include authentication, authorization, and/or accounting. It will be understood that embodiments of the present invention may require any combination of the above services. For example, authentication and authorization may be requested but not accounting. It will be understood that validation may also include other services, such as any services requested by a user's preferences.

In one embodiment, authentication is the verification of the identity of requester 106 (or a user). For example, the authentication of the identity proves that the user is who they say they are and determines what name they are known to the system as. Servicer 102 may make use of AAA server 104 to perform the authentication.

Authorization may be determining any actions that requester 106 is allowed to perform (or has rights to). For example, which resources requester 106 is allowed to access, what the privilege level of requester 106 is, and any other authorization characteristics may be determined.

Accounting services record information about requester 106, such as what requester 106 actually did, what was accessed, how long it was accessed, etc., for accounting, billing, and auditing purposes. Accounting can also track how resources were used and auditing can be used to track network access and detect network intrusions.

Servicer 102 may send a AAA request to AAA server 104. The AAA request may include one or more certificates and any other AAA attributes including attributes used for authentication or authorization. AAA server 104 is then configured to validate the certificate. Also, AAA server 104 is configured to perform AAA services based on the AAA attributes.

After validation, AAA server 104 sends a AAA response to servicer 102. In the case of a public key certificate, servicer 102 may perform a second authentication of requester 106, such as validating proof of possession of the private key of the certificate or authenticating credentials. It should be noted that servicer 102 may also perform the authentication before sending the AAA request. In this case, if proof of possession of the private key or another authentication fails validation, then the AAA request is not sent.

Accordingly, AAA server 104 is used to perform the certificate validation. Additionally, AAA server 104 performs AAA services. However, servicer 102 performs the proof of possession validation of the private key or authentication mechanism. This separates out the certificate validation and AAA services from the verification of the proof of possession of the private key. Accordingly, additional security is provided in that AAA server 104 is not in possession of all the secure information. In addition the computational load is distributed between servicer 102 and AAA server 104 in that servicer 102 is relieved from the burden of performing certificate validation. Further, because the certificate is validated by AAA server 104 in addition to performing AAA services, the process is efficient in that servicer 102 only has to communicate with AAA server 104. Additional round trips to communicate with other parties to perform the certificate validation and have AAA performed are not necessary for servicer 102. The policy for certificate validation can be centralized in AAA server 104 making configuration and deployment easier.

Figure 2:
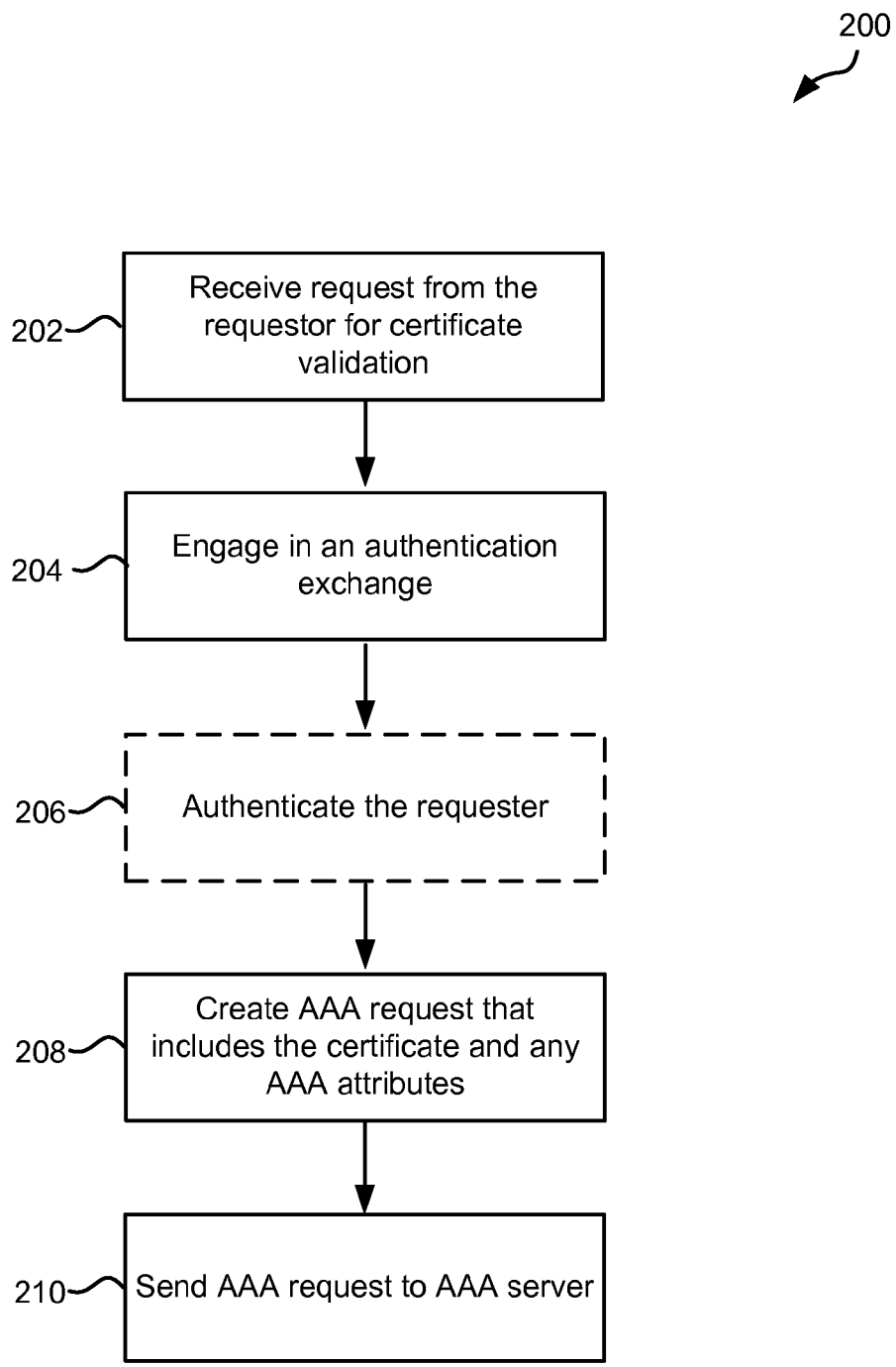
FIG. 2 depicts a simplified flow chart of a method for creating a AAA request according to one embodiment of the present invention.

FIG. 2 depicts a simplified flow chart 200 of a method for creating a AAA request according to one embodiment of the present invention. In step 202, servicer 102 determines a certificate validation is needed. The validation may be needed for the purpose of fulfilling access control requirements for gaining access to resources associated with servicer 102.

In step 204, servicer 102 and requester 106 may engage in an authentication exchange in which both the requester 106 and servicer 102 mutually exchange information for authentication. Although a mutual authentication is described, it will be understood that a one way authentication may be used, such as servicer 102 authenticates requester 106. For example, public key certificates and proof of possession of the corresponding private key may be exchanged. Protocols that may be used for the authentication exchange may include transport layer security (TLS), extensible authentication protocol-TLS (EAP-TLS), secure shell (SSH), Internet Key Exchange (IKE) or any other protocol that can perform mutual authentication using certificates. Alternatively, in step 204, servicer 102 and requester 106 may engage in an authentication protocol in which both requester 106 and servicer 102 mutually authenticate using different credentials such as a password, shared secret or Kerberos ticket. Protocols that may be used for this exchange include various EAP methods (EAP-AKA, EAP-FAST, EAP-MSCHAPv2, EAP-SIM), Kerberos, etc. This authentication step may make use of authentication services provided by AAA server 104.

In step 206, servicer 102 may authenticate requester 106, and vice versa, if necessary. For example, servicer 102 may validate proof of possession of the private key associated with requester 106, and requester 106 may authenticate servicer 102, if necessary. It should be noted that this step is optional in that it may be performed after a AAA request is sent and a response is received from AAA server 104. If the validation of the proof of possession is performed before creating and sending the AAA request, and if proof of possession fails validation, the AAA request is not sent. Alternatively, servicer 102 may authenticate requester 106 through other methods.

The determination as to when to authenticate requester 106 may be based on characteristics of system 100. For example, if servicer 102 includes a lot of processing power, then the authentication of requester 106 may be performed first. This uses processing power of servicer 102 and alleviates unnecessary AAA validations at AAA server 104 if the authentication is not validated.

In another embodiment, the processing power of AAA server 104 may be leveraged. If bandwidth is not an issue in sending AAA requests to AAA server 104, then the AAA request may be sent before authenticating requester 106. This would alleviate extra processing on servicer 102 if AAA requests are denied. Other characteristics may also be used to determine when servicer 102 should authenticate requester 106. In addition the authentication of requester 106 and the AAA request need not be serial. For example the request for certificate validation may be outstanding while the authentication of requester 106 is executing.

In step 208, servicer 102 creates a AAA request that includes the certificate and any AAA attributes. The AAA attributes may describe the context of the requested access and type of access requested by requester 106. Examples of AAA attributes that describe the context of the access may include the addresses of requester 106 and also servicer 102. An example of a AAA attribute describing a type of access may be the service type requested. If requester 106 has been authenticated, then a AAA attribute may contain the authenticated name.

The AAA request may be sent using a AAA protocol, such as remote authentication dial-in user service (RADIUS), DIAMETER or TACACS+. In another embodiment, servicer 102 may include the certificate in a message format that is used in another protocol such as server-based certificate validation protocol (SCVP) or online certificate status protocol (OCSP). Even if the AAA request is sent within a AAA protocol using OCSP, it will be understood that a AAA request may be any request that is sent to AAA server 104 no matter which protocol is used to carry the certificate information.

In step 210, servicer 102 sends the AAA request to AAA server 104. The AAA request may contain authentication information from step 204 as well as certificate information. The process of authentication may take multiple request-response exchanges.

Figure 3:
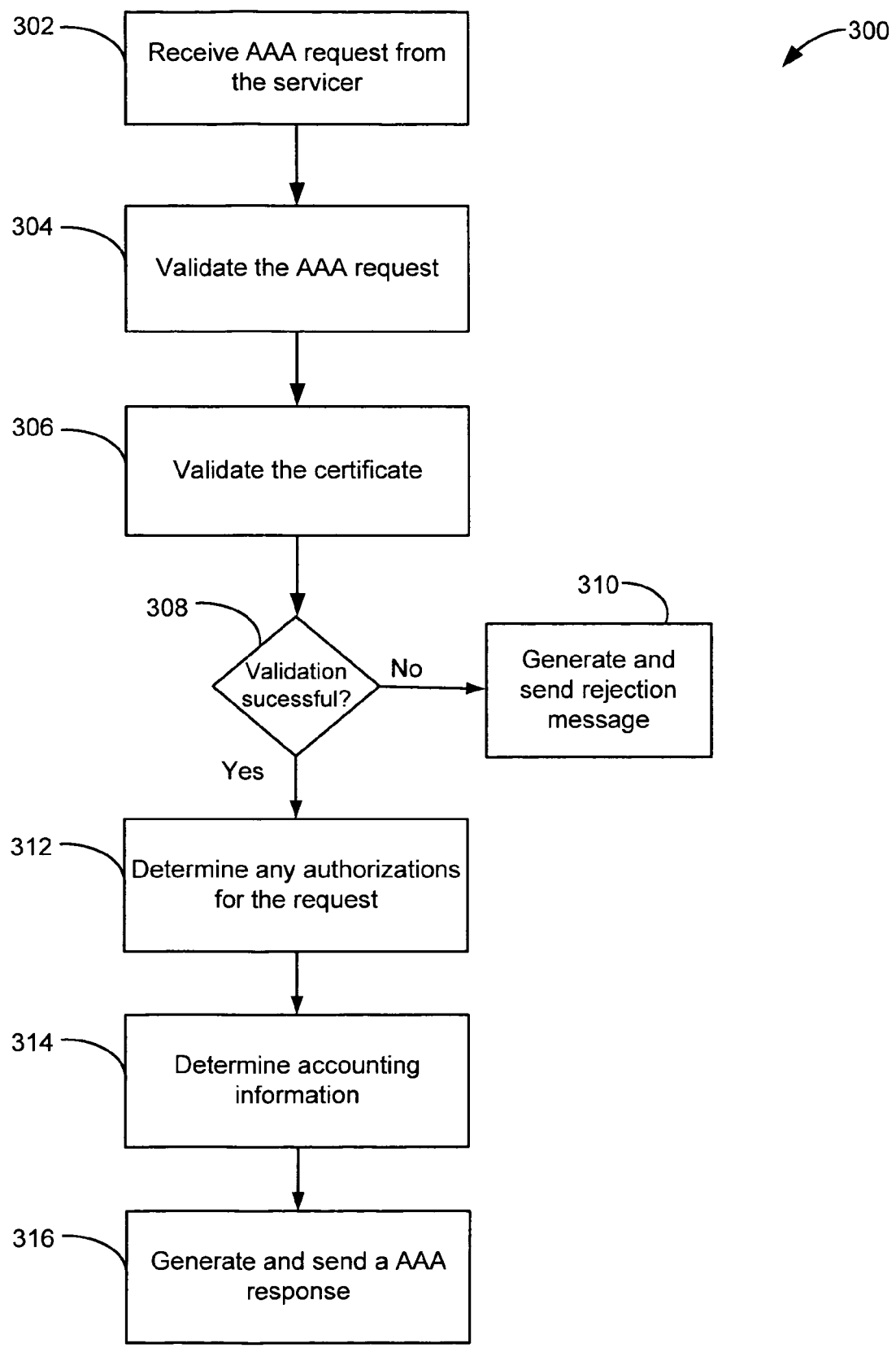
FIG. 3 depicts a simplified flowchart for validating the AAA request according to one embodiment of the present invention.

FIG. 3 depicts a simplified flowchart 300 for validating the AAA request according to one embodiment of the present invention. In step 302, AAA server 104 receives the AAA request from servicer 102.

In step 304, AAA server 104 validates the AAA request. In one embodiment, AAA server 104 determines that the request received is a valid AAA request. The request may be checked to determine if it is properly formed. Other actions to validate the AAA request may also be appreciated.

In step 306, AAA server 104 validates the certificate. AAA server 104 may extract the certificate and perform the certificate validation. This may include validating the integrity and authenticity of the certificate, performing path validation to make sure the certificate chain is correctly routed in a trusted certificate authority (CA) or root certificate, checking the revocation status through the use of certificate revocation lists (CRLs), checking the subject name in a attribute certificate matches an authenticated name, verifying the information in the certificate is appropriate for the services requested and/or other information from the attribute values supplied by servicer 120, or any other methods needed to validate the certificate.

In another embodiment, AAA server 104 may offload the validation of the certificate. For example, AAA server 104 may determine that a certain third party can validate the certificate. A request to the third party is generated with the certificate and sent. When a response is received from the certificate validation, AAA server 104 determines if the certificate was validated or not. Although AAA server 104 has sent the certificate validation to a third party, AAA server 104 is still the central authority for validating the certificate and performing AAA services. In this case, servicer 102 did not need to send the certificate validation to the third party and also send a AAA request to AAA server 104 for AAA services. This eliminates round trips to and from servicer 102 and also offloads processing to AAA server 104 to coordinate the validation.

Step 308 determines if the certificate validation is successful. In step 310, if the validation is not successful, AAA server 104 may generate a rejection message and send it to servicer 102. The message may indicate that the certificate validation was not successful.

In step 312, if the certificate validation was successful, AAA server 104 determines any authorizations for the request. For example, AAA server 104 may use certificate information, such as certain attributes, extensions, name types, or certificate policies within the certificate to determine the authorizations. Also, in determining the authorizations, additional information from the AAA request and/or local information may be used to determine what authorization should be granted to requester 106. For example, a user profile for requester 102 may be used to determine what resources the user is authorized to access. Depending on what access is requested, AAA server 104 determines what authorizations should be granted to requester 102.

In step 314, AAA server 104 determines accounting information. For example, information from the AAA request, certificate information, and/or local information may be used to create an accounting session for requester 106. This accounting session may be used to keep track of any accounting information that occurs during the session, such as what resources are accessed, etc. The accounting session may not be initiated right away, rather the AAA server may include attributes in the AAA response that servicer 102 may include in an explicit accounting start request initiated at a later point in time.

In step 316, AAA server 104 generates a AAA response and sends it to servicer 102. The AAA response may include AAA response attributes that were determined based on the authorizations and accounting information determined. For example, the AAA response attributes may include a network access profile that dictates the access to resources that should be allowed to servicer 102. Also, the accounting information may be information for the accounting session that was or will be created for requester 106. The AAA response may also include additional information that indicates if the certificate validation was successful. The AAA response may include an attribute containing a certificate validation protocol response such as OCSP or SCVP. If the certificate validation was offloaded to a third party, additional information from the third party may be included in the response, such as an OCSP or SCVP response for the certificate validation.

Figure 4:
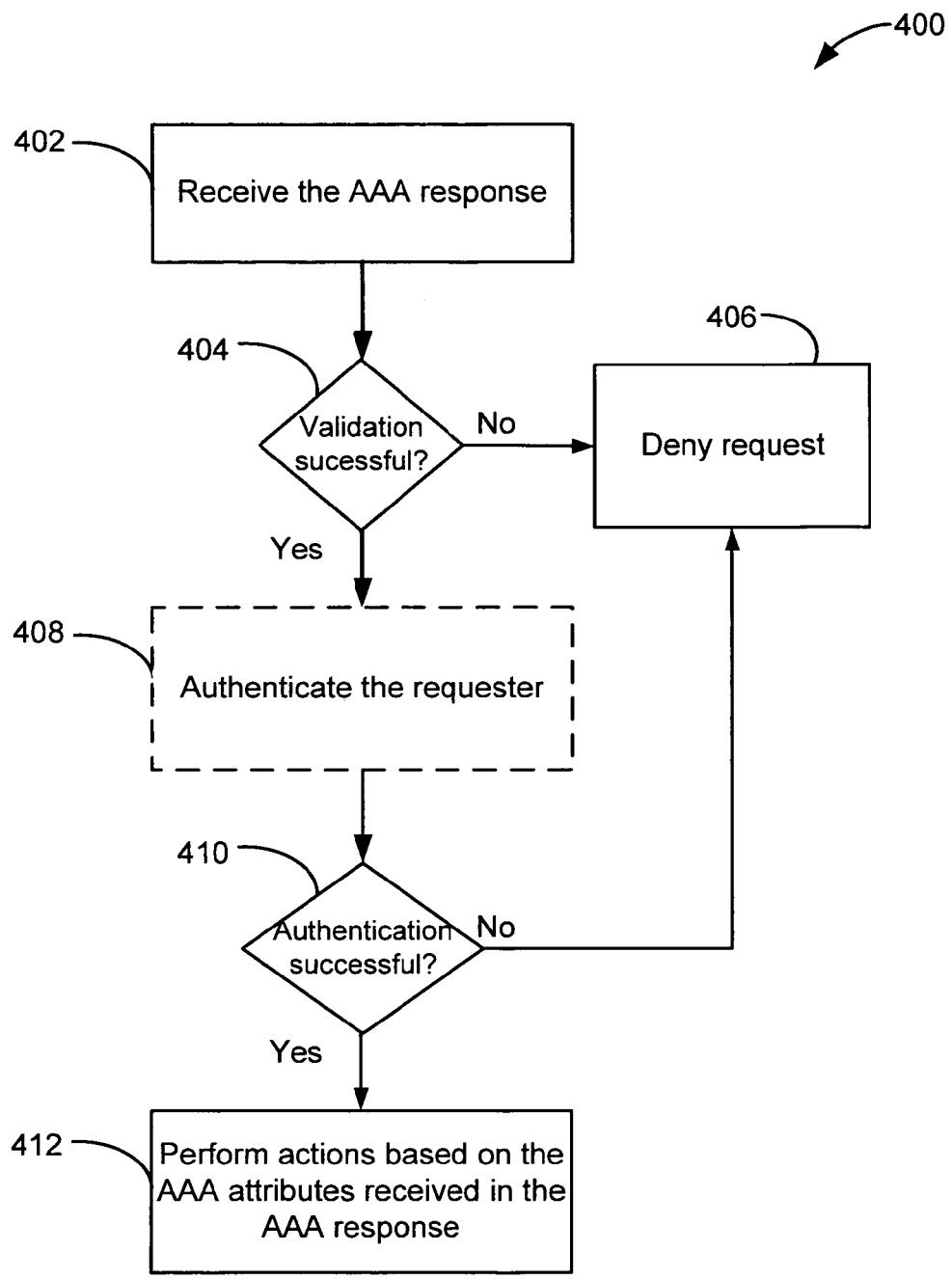
FIG. 4 depicts a simplified flow chart of a method for performing actions after receiving the AAA response according to one embodiment of the present invention.

Servicer 102 may then perform actions based on the AAA response. FIG. 4 depicts a simplified flow chart 400 of a method for performing actions after receiving the AAA response according to one embodiment of the present invention.

In step 402, servicer 102 receives the AAA response from AAA server 104. In step 404, the response is parsed and it is determined if the certificate was validated. If the certificate was not validated, servicer 102 denies the request in step 406. In this case, servicer 102 may send a deny message to requester 106 and also does not allow the access requested.

If the certificate is valid, in step 408, servicer 102 may authenticate requester 106. As discussed above, this step is optionally performed at this time and may be performed before sending the AAA request.

Step 410 determines if the authentication of requester 106 is successful. If the authentication is not successful, step 406 is performed where servicer 102 denies access.

If the authentication is successful, in step 412, servicer 102 performs actions based on the AAA attributes received in the AAA response. For example, the authorization information may be used to determine which resources requester 106 is allowed to access. Also, the accounting information may be used to generate additional AAA requests track the usage of the resources in an accounting session.

Figure 5:
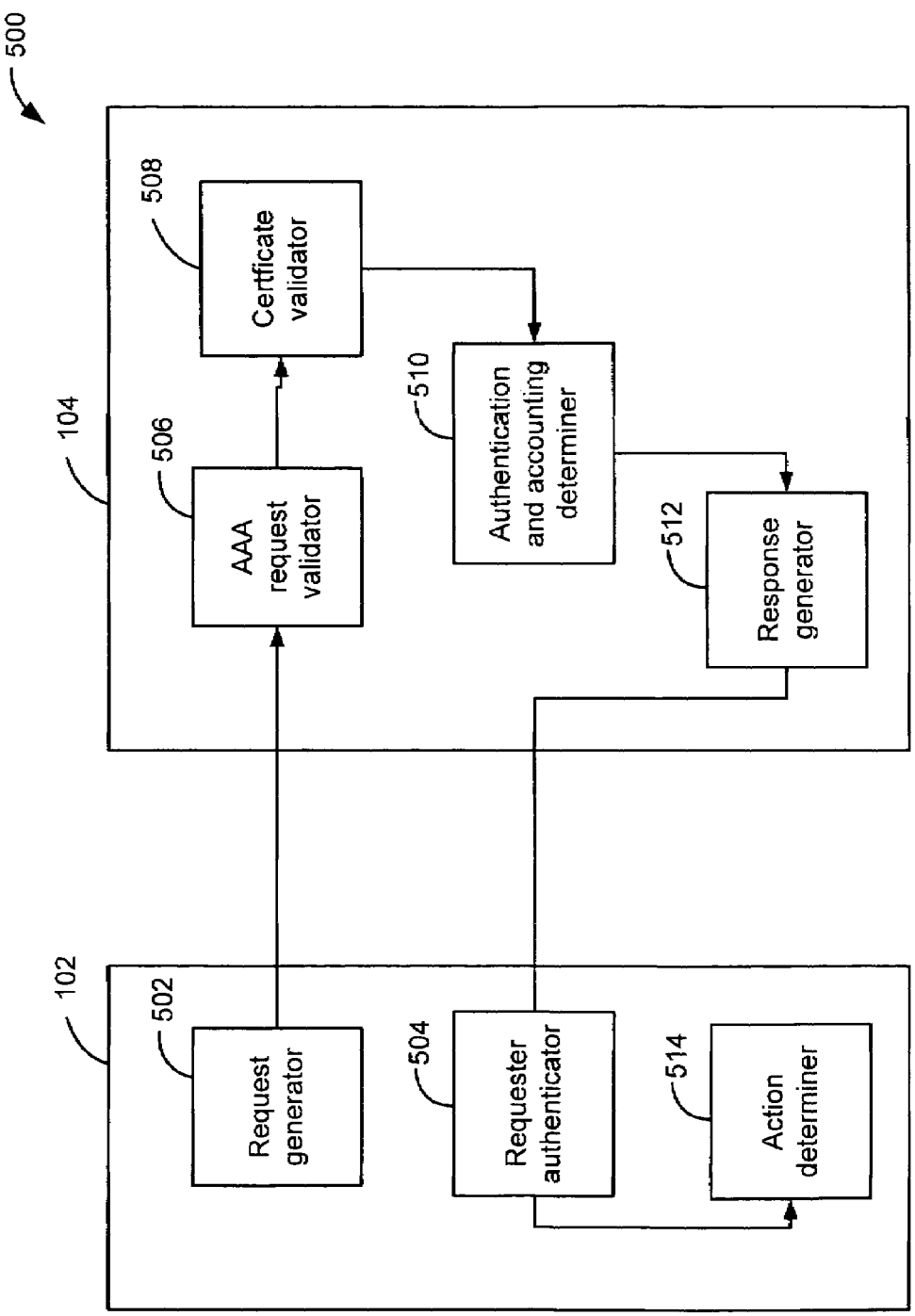
FIG. 5 depicts an embodiment of a servicer and a AAA server according to embodiments of the present invention.

FIG. 5 depicts a more detailed embodiment of servicer 102 and AAA server 104 according to embodiments of the present invention. Servicer 102 includes a request generator 502, a requester authenticator 504, and an action determiner 514. AAA server 104 includes a AAA request validater 506, a certificate validater 508, an authentication and accounting determiner 510 and a response generator 512.

Request generator 502 is configured to receive a request from requester 106. Request generator 502 then generates a AAA request that includes the certificates and any AAA attributes. Request generator 502 then sends the AAA request to AAA server 104.

AAA request validater 506 is configured to receive the AAA request and validate the AAA request. If the AAA request is valid, a certificate validater 508 is configured to validate the certificate. Certificate validater 508 may offload the certificate validation to a third party or may validate the certificate itself.

If the certificate is validated, authentication and accounting determiner 510 determines any authorizations and accounting information for requester 102.

Response generator 512 then generates a response that includes the result of the certificate validation and also any authentication, authorization, and accounting information. Response generator 512 then sends the AAA response to servicer 102.

Servicer 102 receives the response and requester authenticator 504 may then authenticate requester 106. As described above, the authentication may be performed before or after the AAA response is sent or received.

If requester 106 is authenticated, action determiner 514 may perform any actions for the request. For example, action determiner 514 may allow access to any resources. Further, action determiner 514 may perform actions based on the authentication, authorization, and accounting information included in the request.

Embodiments of the present invention provide many advantages. For example, a AAA infrastructure is used to perform certificate validation. This allows for certificate validation to be performed along with authorization and accounting services. This minimizes round trips to a AAA server 104 by centralizing the certificate validation and AAA services through a single request to AAA server 104. It also improves the manageability of the system by centralizing the certificate management policy with other authentication and authorization policy in AAA server 104.

Also, the authentication and accounting determiner 510 may retrieve the authenticated name from the certificate and place it in a normalized format that is recognizable by components of a system. This allows AAA server 104 to normalize different name formats in different types of certificates so they can be easily understood throughout the system.

Also, the distribution of many cryptographic calculations is provided in that AAA server 104 performs the certificate validation and AAA services and servicer 102 performs the validation of proof of possession of private key or other authentication. This provides security and scalability in that proof of possession is separated from the certificate validation and resource use may be shifted between the AAA server and servicer 102.

Although the invention has been described with respect to specific embodiments thereof, these embodiments are merely illustrative, and not restrictive of the invention. The certificate sent between requester 106, servicer 102, and AAA server 104 may be a certificate chain or set. Also, the certificate may be a pointer to the certificate or hash of the certificate. Any reference to a certificate may include a certificate chain or set, a pointer, hash, or any other instance of a certificate. The certificates may include X.509, PKC, X.509 AC, SPKI, or any other certificates. The protocol used between requester 106 and servicer 102 may be TLS (e.g., HTTP, SIP, IMAP, etc.), DTLS, SSH, EAP-TLS, PEAP, EAP-TTLS, EAP-FAST, IKE, or any other protocol that uses certificate-based authentication.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store, the program for use by or in connection with the instruction execution system, apparatus, system or device. The computer-readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method of providing a service to a requester, comprising:
   determining, using a servicer that is structured and arranged to provide a service to a requester, if certificate validation of a requester certificate is needed for access by the requester to the service;
   authenticating, using the servicer, the requester, wherein the authenticating comprises validating a proof of possession of a private key;
   creating, using the servicer, an authentication, authorization, and accounting (AAA) request, the AAA request including the requester certificate and an AAA validation attribute, wherein the AAA validation attribute describes a context and a type of the requested access;
   sending, using the servicer, the AAA request to an AAA server, wherein the AAA server is structured and arranged to determine if available resources within the AAA server are able to support the certificate validation;
   verifying, using the AAA server, that the AAA request is a proper request, the proper request including sufficient and properly formed data for the AAA server to perform AAA services;
   performing, using the AAA server, the certificate validation to indicate whether communications originate from the requester, by:
      validating the certificate using resources internal to the AAA server if available resources within the AAA server are able to support the certificate validation, and
      communicating with a validation resource external to the AAA server to validate the certificate if resources internal to the AAA server are not able to support the certificate validation, the communications comprising:
         selecting, in the AAA server, the external validation resource capable of performing path validation on the certificate,
         generating, in the AAA server, a request to the external validation resource for performing path validation on the certificate, the request generated using the certificate,
         receiving, at the AAA server and from the external validation resource, a response based on results from performing path validation on the certificate chain to verify the certificate is routed to a trusted certificate authority, and
         based on the received response, determining, in the AAA server, whether the certificate was validated by the external resource;
   receiving, from the AAA server and using the servicer, a AAA response that includes a result of the certification validation, a certificate validation protocol response for the certification validation, and the AAA response attributes, the AAA response attributes comprising information from the external validation resource when the external validation is used to validate the certificate; and
   performing, using the servicer, an action based on the AAA response.

2. The method of claim 1, wherein the authenticating further comprises authenticating an owner of the certificate.

3. The method of claim 1, wherein if the authentication is performed after receiving the AAA response, the action is based on a result of the authentication.

4. The method of claim 2, wherein the sending, receiving, and performing steps are not performed if the authentication is not validated.

5. The method of claim 1, wherein the performing the action comprises allowing the requested access to the service.

6. The method of claim 5, wherein the access allowed is based on authorizations in the AAA response attributes received in the AAA response.

7. The method of claim 1, wherein the performing the action comprises denying the requested access to the service if the certificate is not validated.

8. The method of claim 1, wherein the performing the action comprises performing an accounting action based on the accounting information in the AAA response attributes received in the AAA response.

9. A method, comprising
   receiving, from a service, an authentication, authorization, and accounting (AAA) request at an AAA server, wherein the AAA server is structured and arranged to determine if available resources within the AAA server are able to support the certificate validation, the AAA request including the certificate and an AAA validation attribute, wherein the AAA validation attribute describes a context and a type of requested access, the certificate being associated with a requester of the access, and wherein the service validates a proof of possession of a private key;
   verifying, using the AAA server, that the AAA request is a proper request, the proper request including sufficient and properly formed data for the AAA server to perform AAA services;
   validating the certificate included in the AAA request using the AAA server by:

validating the certificate using resources internal to the AAA server if available resources within the AAA server are able to support the certificate validation, and communicating with a validation resource external to the AAA server to validate the certificate if resources internal to the AAA server are not able to support the certificate validation, the communications comprising:

selecting, in the AAA server, the external validation resource capable of performing path validation on the certificate, generating, in the AAA server, a request to the external validation resource for performing path validation on the certificate, the request generated using the certificate, receiving, at the AAA server and from the external validation resource, a response based on results from performing path validation on the certificate chain to verify the certificate is routed to a trusted certificate authority, and based on the received response, determining, in the AAA server, whether the certificate was validated by the external resource;

performing AAA services using the AAA validation attribute to determine AAA response attributes, the AAA response attributes comprising information from the external validation resource when the external validation is used to validate the certificate; and sending a AAA response to the service, the AAA response including a result of the certificate validation, a certificate validation protocol response for the certificate validation, and the AAA response attributes.

10. The method of claim 9, wherein the service authenticates an owner of the certificate.

11. The method of claim 9, wherein performing the AAA services comprises authenticating the service that sent the request.

12. The method of claim 9, wherein the certificate validation protocol response is selected from server-based certificate validation protocol (SCVP) and online certificate status protocol (OCSP).

13. The method of claim 9, wherein the performing the AAA services comprises determining the authorization information for the service, the authorization information indicating authorizations that can be granted to the requestor to the service.

14. The method of claim 9, wherein the performing AAA services comprises determining the accounting information for the service to be included in the AAA response attributes.

15. An apparatus, comprising:
one or more processors; and
a memory containing instructions that, when executed by the one or more processors, cause the one or more processors to perform a set of steps comprising:
determining when a certificate validation is needed for access by a requester to a service;
authenticating, using the servicer, the requester, wherein the authenticating comprises validating a proof of possession of a private key;
creating an authentication, authorization, and accounting (AAA) request, the AAA request including the certificate and an AAA validation attribute, wherein the AAA validation attribute describes a context and a type of the requested access;
sending the AAA request to an AAA server wherein the AAA server is structured and arranged to determine if available resources within the AAA server are able to support the certificate validation;
verifying, using the AAA server, that the AAA request is a proper request, the proper request including sufficient and properly formed data for the AAA server to perform AAA services;
performing, using the AAA server, the certificate validation to indicate whether communications originate from the requester, by:

validating the certificate using resources internal to the AAA server if available resources within the AAA server are able to support the certificate validation, and communicating with a validation resource external to the AAA server to validate the certificate if resources internal to the AAA server are not able to support the certificate validation, the communications comprising:

selecting, in the AAA server, the external validation resource capable of performing path validation on the certificate, generating, in the AAA server, a request to the external validation resource for performing path validation on the certificate, the request generated using the certificate, receiving, at the AAA server and from the external validation resource, a response based on results from performing path validation on the certificate chain to verify the certificate is routed to a trusted certificate authority, and based on the received response, determining, in the AAA server, whether the certificate was validated by the external resource;

receiving, from the AAA server and using the servicer, a AAA response that includes a result of the certificate validation, a certificate validation protocol response for the certificate validation, and the AAA response attributes, the AAA response attributes comprising information from the external validation resource when the external validation is used to validate the certificate; and performing an action based on the AAA response.

16. The apparatus of claim 15, wherein the authenticating further comprises
authenticating an owner of the certificate.

17. The apparatus of claim 16, wherein if the authentication is performed after receiving the AAA response, the action performed is based on a result of the authentication.

18. The apparatus of claim 16, wherein the sending the AAA request, the receiving the AAA response, and the performing the action are not performed if the authentication is not validated.

19. The apparatus of claim 15, wherein the performing the action comprises allowing the requested access to the service.

20. The apparatus of claim 19, wherein the access allowed is based on authorizations in the AAA response attributes received in the AAA response.

21. The apparatus of claim 15, wherein the performing the action comprises denying the requested access to the service if the certificate is not validated.

22. The apparatus of claim 15, wherein the performing the action comprises performing an accounting action based on the accounting information in the AAA response attributes received in the AAA response.

23. An apparatus, comprising:
one or more processors; and a memory containing instructions that, when executed by the one or more processors, cause the one or more processors to perform a set of steps comprising:

receiving, from a service, an authentication, authorization, and accounting (AAA) request at an AAA server, wherein the AAA server is structured and arranged to determine if available resources within the AAA server are able to support the certificate validation, the AAA request including a certificate and an AAA validation attribute, wherein the AAA validation attribute describes a context and a type of requested access, the certificate being associated with a requester of the access, and wherein the service validates a proof of possession of a private key;

verifying, using the AAA server, that the AAA request is a properly formed request, the properly formed request including the certificate and one or more of the AAA validation attribute;

validating the certificate included in the AAA request by:
  validating the certificate using resources internal to the AAA server if available resources within the AAA server are able to support the certificate validation, and
  communicating with a validation resource external to the AAA server to validate the certificate if resources internal to the AAA server are not able to support the certificate validation, the communications comprising:
    selecting, in the AAA server, the external validation resource capable of performing path validation on the certificate,
    generating, in the AAA server, a request to the external validation resource for performing path validation on the certificate, the request generated using the certificate,
    receiving, at the AAA server and from the external validation resource, a response based on results from performing path validation on the certificate chain to verify the certificate is routed to a trusted certificate authority, and
    based on the received response, determining, in the AAA server, whether the certificate was validated by the external resource;

performing AAA services using the AAA validation attribute to determine AAA response attribute, the AAA response attributes comprising information from the external validation resource when the external validation is used to validate the certificate; and sending a AAA response to the service, the AAA response including a result of the certificate validation, a certificate validation protocol response for the certificate validation, and the AAA response attributes.

24. The apparatus of claim 23, wherein the service authenticates an owner of the certificate.

25. The apparatus of claim 23, wherein the performing the AAA services comprises authenticating the service that sent the request.

26. The apparatus of claim 23, wherein the certificate validation protocol response is selected from server-based certificate validation protocol (SCVP) and online certificate status protocol (OCSP).

27. The apparatus of claim 23, wherein the performing the AAA services comprises determining the authorization information for the service, the authorization information indicating authorizations that can be granted to the requestor to the service.

28. The apparatus of claim 23, wherein the performing AAA services comprises determining the accounting information for the service to be included in the AAA response attributes.

* * * * *